Oct. 7, 1930.  A. C. LILLIE  1,777,569
AUXILIARY WINDSHIELD
Filed Sept. 22, 1926
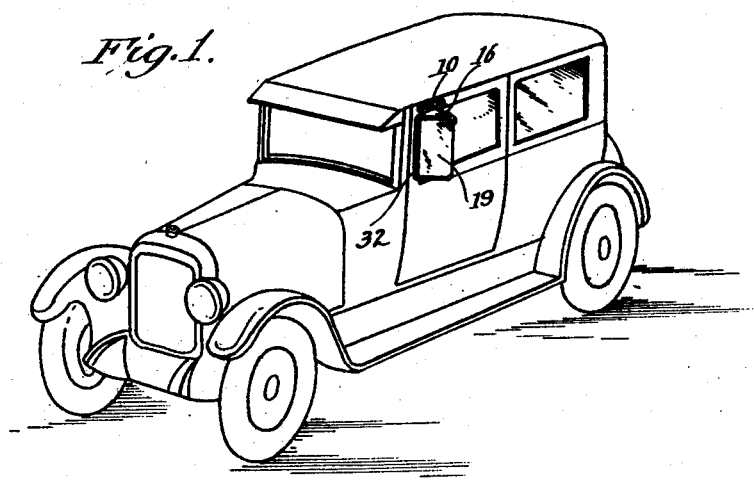
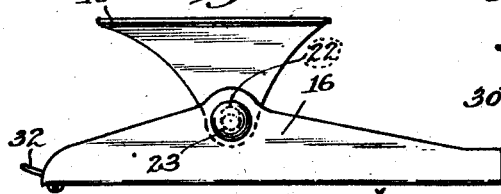
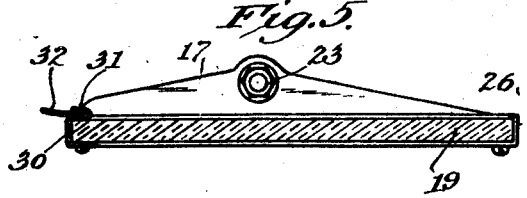
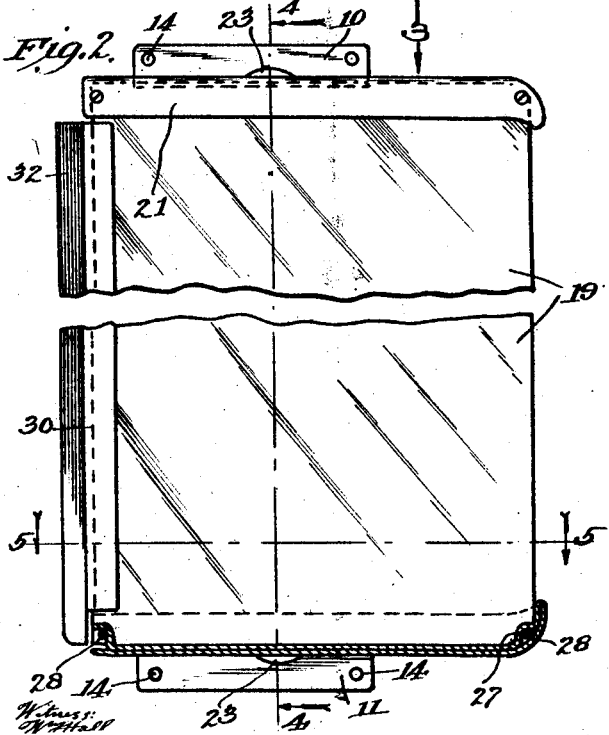
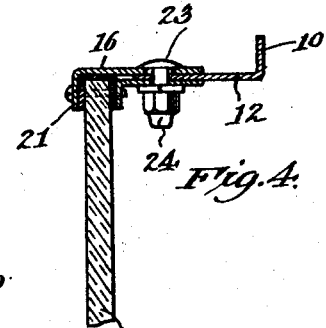
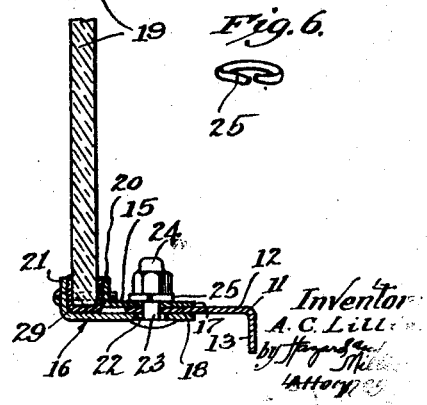

Patented Oct. 7, 1930

1,777,569

UNITED STATES PATENT OFFICE

ARTHUR C. LILLIE, OF LOS ANGELES, CALIFORNIA

AUXILIARY WINDSHIELD

Application filed September 22, 1926. Serial No. 137,040.

This invention relates to improvements in auxiliary windshields for vehicles.

In automobiles of the closed car type it is customary for the drivers of such vehicles to have the window in the door adjacent the driver's seat lowered. This window being open not only provides for ventilation within the vehicle but allows the driver to give direction signals quite readily with his arm. As the window is open a major portion of the time, there frequently is a considerable draft through it and rain or snow is also apt to enter it.

An object of this invention is to provide an auxiliary windshield which has been primarily designed to be used upon vehicles of the closed car type, but it will be readily understood that the windshield may be equally well employed upon other vehicles and in different situations. By providing an auxiliary windshield on a vehicle of the closed car type forwardly of the above mentioned window, the excess draft through this window is effectively stopped and the entrance of rain and snow is also greatly reduced.

Another object of this invention is to provide an auxiliary windshield having a novel, efficient and durable yet simple construction for supporting the glass.

A further object of this invention is to provide a supporting construction for supporting the glass of an auxiliary windshield which will prevent up and down and also lateral movement or loosening and which will also be so constructed that no holes will be formed in the glass.

With the foregoing and other objects in view which will be made manifest in the following detailed description and specifically pointed out in the appended claims, reference is had to the accompanying drawings for an illustrative embodiment of the invention, wherein:

Figure 1 is a perspective view of a vehicle to which the improved windshield has been applied, Fig. 2 is a front view in elevation, parts being broken away and shown in vertical section illustrating the improved windshield, Fig. 3 is a top plan view taken in the direction of the arrow 3 upon Fig. 2, Fig. 4 is a vertical section taken upon the line 4—4 of Fig. 2, Fig. 5 is a horizontal section taken on the line 5—5 upon Fig. 2, and Fig. 6 is a perspective view of the spring washer employed upon each supporting construction.

Referring to the accompanying drawings wherein similar reference characters designate similar parts throughout, the improved auxiliary windshield consists of top and bottom supporting brackets 10 and 11 which are angular in form and each of which has an outstanding apertured portion 12. These brackets may be formed of sheet metal or any other material and in their upright portions 13 they have apertures 14 for the reception of screws to fasten them to the body or the door of a vehicle. Associated with each supporting bracket are two sheet metal members indicated at 15 and 16 respectively. These sheet metal members are also angular in cross section having body portions or ears 17 and 18 respectively which are adapted to be positioned on opposite sides of the outstanding portions 12 of their respective supporting brackets. The sheet metal members 15 and 16 are substantially as long as the pane 19 is wide, and each has an upturned flange 20 and 21 respectively. The two members are so constructed that they have apertures 22 formed in their body portions or ears 17 and 18, and these apertures can be caused to register with each other and with the aperture in the outstanding portion 12 of the supporting bracket, so that a bolt 23 may be passed therethrough and receive a nut 24 and a split spring washer 25. When the sheet metal members 15 and 16 are thus fastened to their respective supporting brackets, the two flanges 20 and 21 are spaced from each other a distance approximately equal to the thickness of the pane 19, thus forming channels at the top and bottom of the pane which are adapted to receive the top and bottom edges of the pane. The ends of the flange 21 on the member 16 are bent toward the flange 20 as is indicated at 26, thus forming ends for the channels, so that when the top and bottom edges are disposed within the channels, the corners of the pane are covered and also lateral movement of the pane in the channels is effectively prevented.

The corners of the pane are recessed or notched, as indicated at 27, and screws 28 are threaded through the flanges 20 and 21 serving to connect these flanges to each other and cause them to clamp upon the sides of the glass pane 19. Within each channel there is preferably provided a rubber or leather spacer 29 which is channel-shaped in form and has the ends of its bottom slightly extended and bent upwardly over the screws 28. This rubber member serves to prevent the glass from coming in contact with metal and becoming chipped. On the forward side edge of the glass pane 19 there is clamped a U-shaped metal strip 30 having one of its sides reversely bent upon itself, as indicated at 31, to clamp upon a rubber or leather weather strip 32.

When the brackets 10 and 11 are mounted upon the vehicle, the two sheet metal members 15 and 16 are assembled together over the edges of the glass pane. They then have their ears or body portions positioned in contact with the outstanding portions 12, so that the member 15 is on one side and the member 16 is on the other. The bolt 23 is then passed through the registering apertures one of which is slightly ovalescent in form in the sheet metal members to take care of variations in thickness of the glass, and the spring washer and nut 24 are applied to each bolt. On tightening the bolt 24, the ears or body portions of the sheet metal members will be caused to clamp upon the outstanding portion 12 so as to frictionally hold the auxiliary windshield or pane 19 in adjusted position, which may be in the position shown in Fig. 1, wherein the weather strip 32 is in contact with the body of the vehicle, preventing the passage of air between the forward side edge of the pane and the body. By having the sheet metal members on opposite sides of the outstanding portion 12 there is a considerable amount of surface on the sheet metal members in contact with the outstanding portion, which by this large contacting surface establishes a good frictional contact which will firmly hold the pane in any adjusted position. The spring washer 25 serves to keep the bolt tight and may also serve as a lock resisting loosening of the nut.

By reason of the fact that the body portions 17 and 18 engage upon opposite sides of the outstanding portion of the bracket, there is a large quantity of surface upon the movable part of the windshield which is in contact with the stationary brackets. Because of this it is not necessary to have the bolts 25 very tight in order to have sufficient friction to hold the windshield in any adjusted position. Furthermore, the wear developed by these surfaces rubbing on each other when the wind shield is turned, is distributed over a large area, and consequently, it is seldom necessary to tighten the bolts 23 to take up the wear.

It will be noted that the body portions 17 and 18 are at right angles to their respective flanges, and that they are as wide at the point where they join the flanges as the flanges are long. Consequently, the flanges are strengthened throughout their complete length so that when the screws 28 are tightened, the flanges will clamp firmly against the pane 19 along its entire edge.

From the above described construction it will be appreciated that a new auxiliary windshield is provided having a very simple yet durable construction for supporting the glass pane. It will be appreciated that each of the top and bottom edges of the pane are completely enclosed and firmly held, reducing greatly any danger of breaking the glass. Furthermore, it is not necessary to drill any holes through the glass, which on having screws or bolts pass through them might be cracked thereby. The supporting brackets and sheet metal members can all be made out of sheet metal and bent into their desired shape very easily at a minimum expense. It will also be understood that the improved windshield is provided with a weather strip which prevents the passage of air between the body of the vehicle and the windshield, thus increasing its effectiveness. From an inspection of Fig. 1 it will be appreciated that the improved windshield enables the driver of a closed car to keep his window down practically continuously for ventilation and for signalling purposes, and at the same time there is no excess draft through this open window, and the danger of rain or snow entering through it is greatly reduced.

It will be understood that various changes may be made in the detail of construction without departing from the spirit and scope of the invention as defined by the appended claims.

I claim:

1. An auxiliary windshield comprising top and bottom securing brackets, each bracket having an outstanding portion, a pane of transparent material, two members associated with each bracket and arranged against opposite sides of the outstanding portion, and a bolt fastening the outstanding portion and members together and urging the members into frictional engagement with their respective sides of the outstanding portion, said members cooperating to form channels having closed ends which receive the top and bottom edges of the pane respectively.

2. An auxiliary windshield comprising top and bottom securing brackets, each having an outstanding portion, two sheet metal members associated with each bracket having their body portions disposed on opposite sides of the outstanding portion, a single bolt securing the members and bracket together, said members having flanges cooperating together forming sides of the channel, a pane of transparent material having its edges disposed in the channels thus formed, the ends of the flange on one member being bent toward the other flange, thus closing the ends of the channels to prevent lateral movement of the pane.

3. An auxiliary windshield comprising top and bottom securing brackets, two sheet metal members for each bracket, each sheet metal member having a body portion and a flange bent at right angles thereto, the body portion where it joins the flange being as wide as the flange is long, means for securing the body portions of said sheet metal members to each other and to their respective brackets, said flanges co-operating to form channels, and a pane of transparent material having its edges disposed in said channels.

4. An auxiliary windshield comprising top and bottom securing brackets, two sheet metal members for each bracket, each sheet metal member having a body portion and a flange bent at right angles thereto, the body portion where it joins the flange being as wide as the flange is long, means for securing the body portions of said sheet metal members to each other and to their respective brackets, said flanges co-operating to form channels, a pane of transparent material having its edges disposed in said channels, and means connecting the corresponding flanges to each other so as to cause the flanges to clamp upon the pane.

5. An auxiliary windshield comprising top and bottom securing brackets, a sheet metal member secured to each bracket, each sheet metal member having a flange bent at right angles to its body portion, a pane of transparent material fitting between said sheet metal members and positioned against the flanges thereon, and a second sheet metal member for each of the first sheet metal members, each of the second sheet metal members having a flange positioned against the opposite side of the pane and having a body portion bent at right angles thereto, and means connecting said sheet metal members which are associated with each bracket together.

6. An auxiliary windshield comprising top and bottom securing brackets, a sheet metal member secured to each bracket, each sheet metal member having a flange bent at right angles to its body portion, a pane of transparent material fitting between said sheet metal members and positioned against the flanges thereon, and a second sheet metal member for each of the first sheet metal members, each of the second sheet metal members having a flange positioned against the opposite side of the pane and extending around one edge of the pane and having a body portion bent at right angles thereto, and means connecting said sheet metal members which are associated with each bracket together, the body portions of said sheet metal members being as wide where they join the flanges as the flanges are long.

In testimony whereof I have signed my name to this specification.

ARTHUR C. LILLIE.